US012700766B2

(12) United States Patent
Motte et al.

(10) Patent No.: US 12,700,766 B2
(45) Date of Patent: Aug. 4, 2026

(54) WINDING GUIDE FOR A ROTOR OF AN ELECTRIC MOTOR

(71) Applicant: AMPERE S.A.S., Boulogne Billancourt (FR)

(72) Inventors: Emmanuel Motte, Cleon (FR); Daniella Vivas-Marquez, Guyancourt (FR)

(73) Assignee: AMPERE S.A.S., Boulogne Billancourt (FR)

( * ) Notice: Subject to any disclaimer, the term of this patent is extended or adjusted under 35 U.S.C. 154(b) by 335 days.

(21) Appl. No.: 18/691,056

(22) PCT Filed: Sep. 7, 2022

(86) PCT No.: PCT/EP2022/074916
§ 371 (c)(1),
(2) Date: Jun. 26, 2024

(87) PCT Pub. No.: WO2023/041403
PCT Pub. Date: Mar. 23, 2023

(65) Prior Publication Data
US 2024/0380271 A1      Nov. 14, 2024

(30) Foreign Application Priority Data
Sep. 14, 2021    (FR) ..................................... 21 09605

(51) Int. Cl.
*H02K 3/52*        (2006.01)
*H02K 1/26*        (2006.01)

(52) U.S. Cl.
CPC ............... *H02K 3/527* (2013.01); *H02K 1/26* (2013.01); *H02K 2213/03* (2013.01)

(58) Field of Classification Search
CPC ........ H02K 3/522; H02K 3/325; H02K 3/527; H02K 3/48; H02K 3/34; H02K 3/30; H02K 3/345
See application file for complete search history.

(56) References Cited

U.S. PATENT DOCUMENTS

| 9,712,027 B2 | 7/2017 | Birolleau et al. |
| 11,509,182 B2 * | 11/2022 | Tavakoli .............. H02K 15/165 |

(Continued)

FOREIGN PATENT DOCUMENTS

| DE | 10 2018 128 521 A1 | 5/2020 |
| DE | 10 2019 211 262 A1 | 2/2021 |

(Continued)

OTHER PUBLICATIONS

International Search Report issued Dec. 14, 2022 in PCT/EP2022/074916, filed on Sep. 7, 2022, 2 pages.

(Continued)

*Primary Examiner* — Leda T Pham
(74) *Attorney, Agent, or Firm* — Oblon, McClelland, Maier & Neustadt, L.L.P.

(57) ABSTRACT

A winding guide for an electric machine rotor includes a base that is substantially circular about a longitudinal axis, teeth which rise radially from the base, and heads which extend at the free ends of the teeth and which project from the teeth, in cantilevered fashion. At least one of the heads has an inner face turned towards the base including a flat main portion which is inclined by a first angle strictly greater than 0 degrees with respect to the longitudinal axis, and ribs which protrude from the main portion and the vertices of which are flat and inclined with respect to the longitudinal axis by a second angle comprised between zero degrees and the first angle.

13 Claims, 2 Drawing Sheets

(56)  References Cited

U.S. PATENT DOCUMENTS

| | | | |
|---|---|---|---|
| 11,984,766 B2 * | 5/2024 | Chatterjee | H02K 1/28 |
| 12,463,485 B2 * | 11/2025 | Loeprecht | H02K 3/345 |
| 2014/0368068 A1 | 12/2014 | Birolleau et al. | |
| 2016/0211712 A1 | 7/2016 | Patel et al. | |
| 2021/0050761 A1 | 2/2021 | Loos | |
| 2021/0257873 A1 | 8/2021 | Amaya et al. | |

FOREIGN PATENT DOCUMENTS

| | | | |
|---|---|---|---|
| EP | 3 046 233 A1 | 7/2016 | |
| JP | 2000-341896 A | 12/2000 | |
| KR | 2000-0016311 U | 8/2000 | |

OTHER PUBLICATIONS

French Preliminary Search Report issued May 27, 2022 in FR Application 21 09605, filed on Sep. 14, 2021, 3 pages (with English Translation of Categories of Cited Documents).

* cited by examiner

[Fig. 1]
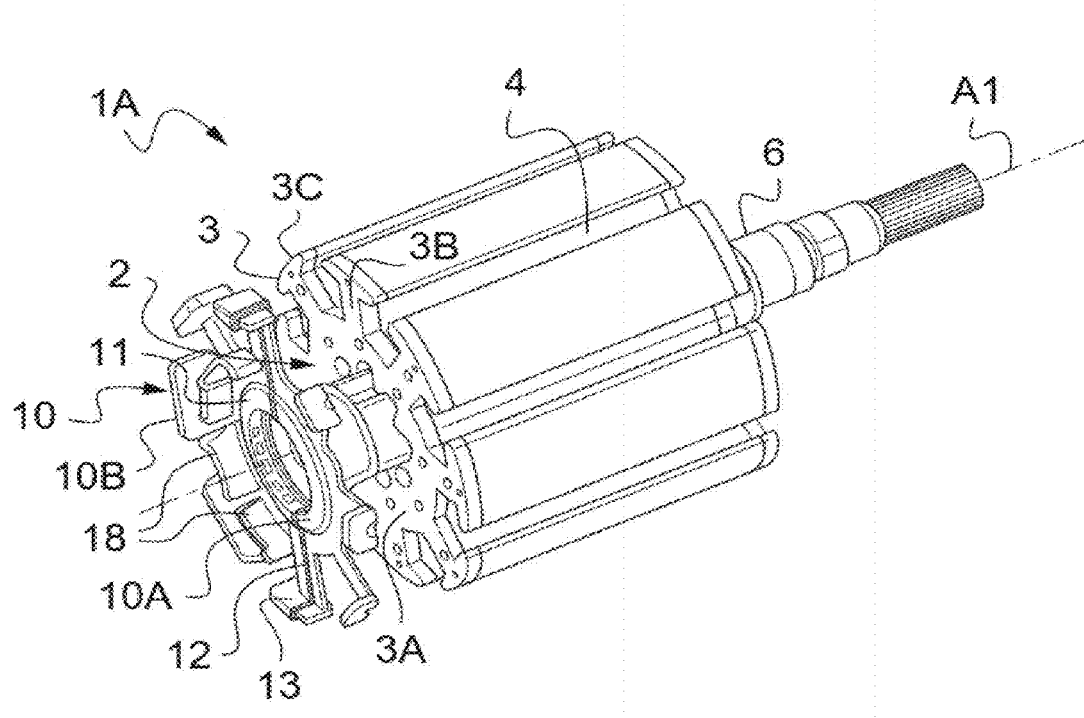
[Fig. 2]
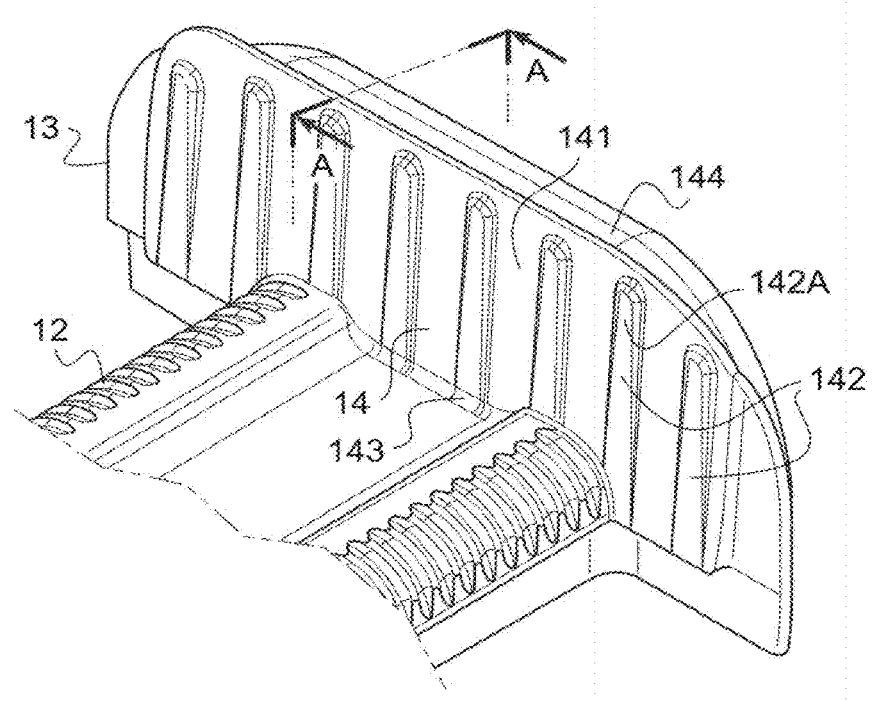

[Fig. 3]
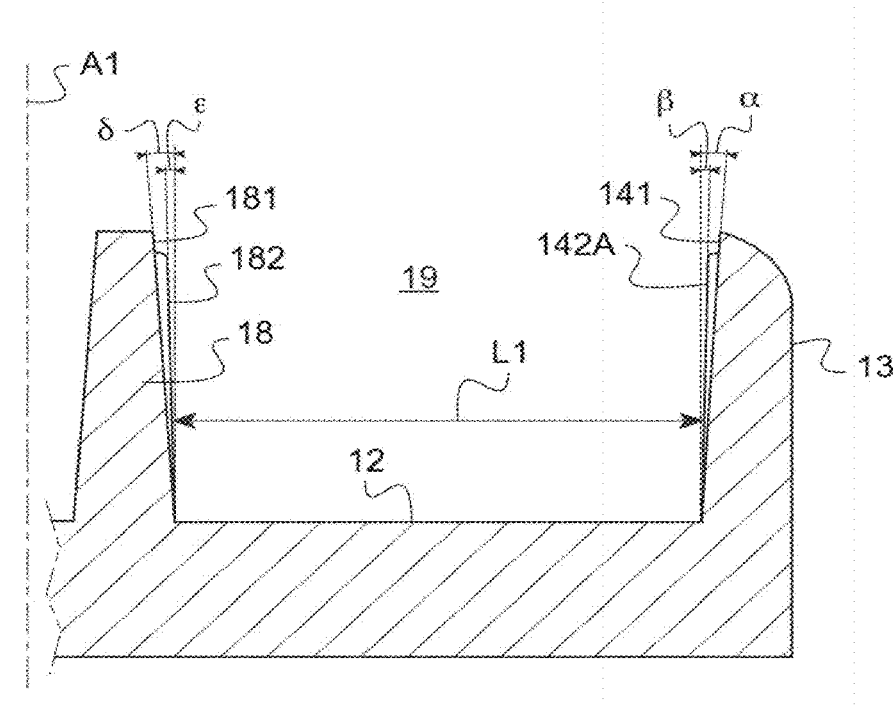
[Fig. 4]
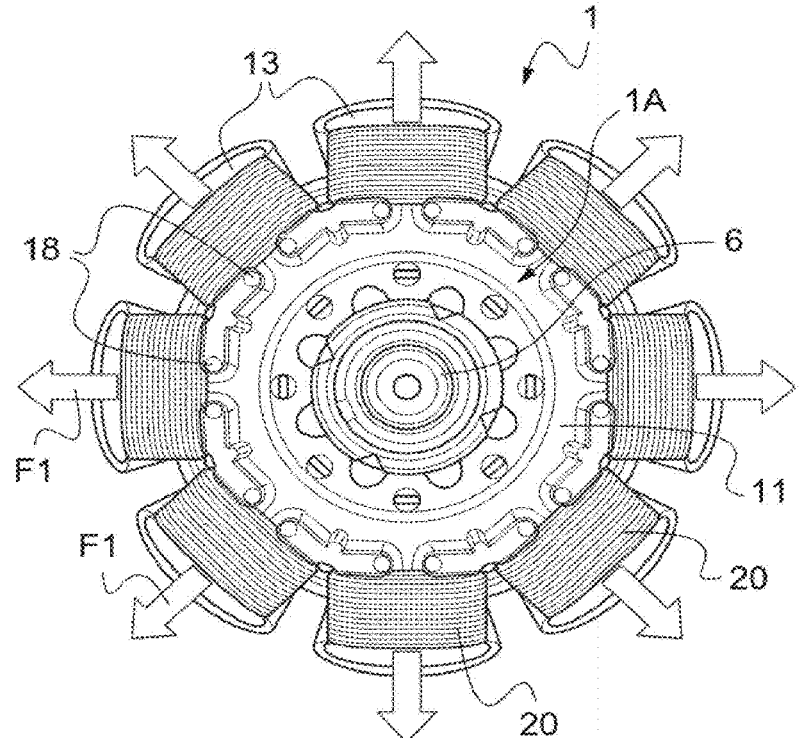

WINDING GUIDE FOR A ROTOR OF AN ELECTRIC MOTOR

TECHNICAL FIELD OF THE INVENTION

The present invention relates generally to electric machines.

It relates more particularly to a winding guide for an electric machine rotor, comprising:

a base that is substantially circular about a longitudinal axis, teeth which rise radially from the base, and heads which extend at the free ends of the teeth and which project from the teeth, in cantilevered fashion.

It relates also to a rotor comprising such a winding guide, an electric machine comprising such a rotor and a motor vehicle comprising such an electric machine.

The invention has a particularly advantageous application in the production of wound rotor synchronous electric machines, and notably traction motors for motor vehicles.

STATE OF THE ART

An electric machine such as a motor generally comprises a rotor and a stator. The rotor is a movable part which revolves, while the stator is a fixed part.

The rotation speed of a rotor in a motor vehicle traction motor exceeds 10,000 revolutions per minute, which generates strong mechanical stresses.

A rotor of wound type that makes it possible to withstand such stresses is described for example in the document WO2020020551.

In this document, the rotor comprises a shaft which revolves about its axis, and a stack of sheets mounted coaxially on the shaft. These sheets form a frame which comprises a tubular body and magnetic poles which protrude radially with respect to this body.

A winding of electric wire is then provided to be wound around each pole. To facilitate the automatic winding of this electric wire around each pole, a winding guide is provided, at each end of the superpositioning of sheets.

These guides each comprise a circular base (extending in the extension of the tubular body), teeth which rise from the circular base (in the extension of the poles) and which each bear a cantilevered head. The electric wire is provided to be wound around each tooth and the corresponding pole. The heads facilitate the winding of the electric wire and they make it possible to radially retain the windings when the rotor revolves.

The forms of the winding guides are designed such that the electric wire can be wound automatically around the poles and the teeth, while being positioned correctly.

As a general rule, the idea consists in winding the electric wire in such a way that the turns are positioned side-by-side in all of the space which is allocated to them, and are superposed on several layers.

Thus, the arrangement of the turns is conditioned by the radial dimension of the allotted space, which is delimited between the head and the base of each tooth of the winding guide.

Ideally, this radial dimension would be constant in all of the allotted space, for the layers of turns to all have the same space in which to be arranged.

This objective is not currently fulfilled when the winding guide is produced in plastic material by an injection moulding operation.

Such a method for manufacturing by injection moulding is operated in fact using moulds whose forms must be designed to allow the winding guides to be stripped from the moulds.

For that, no face of the winding guide is square, which would otherwise prevent this mould-stripping. The faces of the heads of the winding guides currently known are on the contrary slightly inclined to ensure this mould-stripping, and the term draft angle is used in this context.

Unfortunately, these angles, although small, generate electric wire winding defects. Indeed, the draft angle provokes a widening of the space for receiving the electric wire, so that it is found that the turns of electric wire are superposed randomly in the space which is allotted to them.

It is understood that any offset of the turns then leads to a reduction of the performance levels of the electric machine.

SUMMARY OF THE INVENTION

In order to remedy the abovementioned drawback of the state-of-the-art, the present invention proposes not producing the winding guides by means of another manufacturing method, but rather designing guides in such a way as to take into consideration the abovementioned defect of the injection moulding manufacturing method.

More particularly, a winding guide as defined in the introduction is proposed according to the invention, in which provision is made for at least one of the heads to have an inner face which is turned towards the base and which comprises:

a flat main portion which is inclined by a first angle (draft angle) that is strictly greater than 0 degrees with respect to the longitudinal axis, and ribs which protrude from the main portion and the vertices of which are flat and inclined with respect to the longitudinal axis by a second angle comprised within an interval whose lower bound, included in the interval, is zero degrees, and whose upper bound, excluded from the interval, is equal to the first angle.

Thus, the idea consists in very locally reducing the draft angle necessary to the mould-stripping at narrow small surfaces (the vertices of the ribs) onto which the electric wire will be able to be pressed, while leaving most of the inner face of this head inclined with a draft angle that is sufficient to allow the part to be stripped from the mould.

In other words, by virtue of the invention, the ribs of small dimensions have no or little draft angle, but have dimensions that are small enough not to form an obstacle to the mould-stripping. By virtue of these ribs, the winding space delimited between the base and the vertices of these ribs has a constant width, which ensures a better arranging of the turns of electric wire.

Other advantageous and nonlimiting features of the winding guide according to the invention, taken individually or according to all technically possible combinations, are as follows:

the first angle is greater than 1 degree, and is preferably comprised between 1.5 and 2.5 degrees;

the second angle is less than 0.5 degrees, and preferably comprised between 0 and 0.2 degrees;

with the head extending from one side of the tooth and having a first edge attached to the tooth and an opposite free second edge, said ribs extend lengthwise, for at least a part of them, from the first edge towards the second edge;

said ribs have a thickness which is substantially zero at the first edge;

said ribs extend parallel to one another;

said ribs are away from one another by a separation which is less than three times the diameter of the electric wire to be wound around the tooth;

stops are provided which rise from the base, substantially parallel to the heads, to delimit with them spaces for winding an electric wire;

at least one of said stops has an outer face comprising a main portion which is inclined by a third angle strictly greater than 0 degrees with respect to the longitudinal axis and at least one rib which protrudes from the main portion and whose vertex is flat and inclined with respect to the longitudinal axis by a fourth angle comprised between zero degrees which is included and the third angle which is excluded.

The invention relates also to a rotor for an electric machine comprising a frame which comprises:

distributed about a longitudinal axis, elements with magnetic poles separated pairwise by grooves, at at least one of its ends, a winding guide as mentioned above, whose teeth extend in the extension of the elements with magnetic poles, and a coil of conductive electric wire wound around each element with magnetic poles and the corresponding tooth.

It relates also to an electric machine comprising a stator and a rotor as cited above.

It relates finally to a motor vehicle comprising wheels and a powertrain for driving at least some of said wheels in rotation, which comprises an electric machine as cited above.

Obviously, the different features, variants and embodiments of the invention can be associated with one another according to various combinations inasmuch as they are not mutually incompatible or exclusive.

DETAILED DESCRIPTION OF THE INVENTION

The description which follows in light of the attached drawings, given as nonlimiting examples, will give a good understanding as to what the invention consists of and how it can be produced.

In the attached drawings:

FIG. 1 is a perspective schematic view of an electric machine rotor frame according to the invention;

FIG. 2 is a schematic view of a part of a winding guide of the frame of FIG. 1;

FIG. 3 is a view in cross-section along the plane A-A of FIG. 2;

FIG. 4 is a front view of the rotor of FIG. 1.

In FIGS. 1 and 4, a part of an electric machine has been represented.

This electric machine could be a current generator. In this particular case, it is, here, rather a motor vehicle traction motor, which motor can currently have a generator function in certain modes of operation of the vehicle.

This motor therefore forms part of a powertrain installed on the frame of a motor vehicle and coupled to the wheels of this vehicle.

This motor comprises various components, including a casing which houses a stator and a rotor. While the stator is fixed in the casing, the rotor is mounted to be movable in rotation about a longitudinal axis A1.

The rotor is of wound type (see FIG. 4). It therefore comprises a frame 1A and coils 20 of electric wire wound on the frame 1A.

The frame 1A is illustrated in FIG. 1.

This frame 1A comprises a shaft 6 mounted to rotate about the longitudinal axis A1. It also comprises a stack 2 of identical sheets, mounted coaxially on the shaft.

The sheets of this stack 2 extend in a radial plane at right angles to the longitudinal axis A1. In this radial plane, the sheets all have an identical outline, with a body 3A in disc form pierced for the passage of the shaft 6, and protruding poles which are distributed regularly about the longitudinal axis A1.

The sheets are mounted by banding on the outer surface of the shaft 6 of the rotor, such that their protruding poles are superposed in the extension of one another and form "poles 3".

In the exemplary embodiment represented, the stack 2 comprises eight poles 3. However, it could comprise a different number of poles, greater than or at least equal to two.

Each pole 3 has a mushroom form, with a foot 3B which extends radially outward from the rotor, and a cap 3C which forms two ribs protruding laterally on either side of the foot 3B. The function of the ribs 3C is notably to retain, in the radial direction, a winding of electrically conductive wire (which will be described in more detail hereinafter in this explanation), despite the centrifugal force undergone by this winding in the rotation of the rotor 1.

Also provided, at at least one of the ends of this stack 2, is an element that is different from the sheets of the stack 2, here called "winding guide 10".

Preferentially, two identical winding guides 10 are provided at the two ends of the stack 2 of sheets, but only one of them will be described here.

Each winding guide 10 is essentially provided to facilitate the winding of the electric wire around the poles 3.

Each winding guide 10 has, in the example represented in FIG. 1, the particular feature of being composed of a metal core 10A overmoulded by a plastic structure 10B.

As a variant, and even preferentially, it could be produced in a single piece in plastic material.

In FIG. 1, to illustrate the metal core 10A, only a half of the plastic structure 10B has been represented.

The metal core 10A of the guiding flange 10 has a form similar to that of the sheets of the stack 2, with a circular base pierced for the passage of the shaft 6, which extends in a radial plane at right angles to the longitudinal axis A1 of the shaft of the rotor, and protruding poles. However, here, these protruding poles have the forms of tongues folded at right angles towards the front.

At this stage, the front of the rotor can be defined as the side on which the winding guide 10 considered is located. The rear will be the opposite side. The term "inner" or "internal" will designate the side turned towards the longitudinal axis A1 and the term "outer" or "external" will designate the opposite side.

As FIGS. 1 and 2 show, the plastic structure 10B forms, with the metal core 10A, a circular base 11 and teeth 12 which rise radially with respect to the base 11. It also forms, at the end of each tooth 12, a head 13 which projects on either side of the teeth 12 and towards the front.

The teeth 12 and the heads 13 are here all identical but can be asymmetrical between the front and opposite side. Only one of these teeth and only one of these heads will therefore be described, with reference to FIG. 2.

It can be seen in FIG. 2 that the tooth 12 has a section (in a plane orthogonal to the radial axis according to which the tooth rises) of overall rectangular form, with two rounded front edges. These rounded edges are striated so as to guide the first layer of turns of electric wire which will be wound around the tooth 12.

The head 13 extends here at the free end of the tooth 12, and it projects at the front and on the lateral sides thereof, in cantilevered fashion. In other words, the head 13 which has a substantially flat and rectangular plate form extends substantially in a plane orthogonal to the radial axis of the tooth 12.

Each head 13 then has an inner face 14 situated facing the base 11.

On its side, as FIGS. 3 and 4 show, the base 11 bears stops 18, two of which extend facing each head 13 in order to delimit, with the latter, a winding space 19. FIG. 4 well illustrates the coils 20 of electric wires wound in this winding space, between the stops 18 and the heads 13.

The objective of the invention is for the width of this winding space 19 (measured radially with respect to the longitudinal axis A1) to be substantially constant over all the height of the space (the height being measured axially).

Another objective is for the winding guide to be able to be produced in plastic to facilitate the electrical insulation of the wires and avoid damage thereto. The most widely-used method for manufacturing plastics is injection moulding, the use of which is wanted to be possible. Here it is designed to be produced in a mould in two parts which are separated by moving them away on an axis parallel to the longitudinal axis A1.

To achieve these two objectives, the inner face 14 of the head 13 is not square with respect to the tooth 12 (it has a non-zero draft angle) and it is not perfectly flat.

Its inner face 14 has more specifically a major part, called main portion 141 (see FIG. 2), which is flat and which is inclined by a non-zero draft angle $\alpha$ with respect to the longitudinal axis, and ribs 142 which protrude from the main portion 141 and of which the vertices 142A are flat and inclined with respect to the longitudinal axis A1 by a small angle $\beta$ comprised between 0 (included) and the draft angle $\alpha$ (excluded).

The draft angle $\alpha$ is oriented such that the head 13 becomes thinner from the edge 143 of the head 13 which is attached to the tooth 12 to the opposite free edge 144. The small angle $\beta$ is oriented in the same way.

Preferentially, as FIG. 3 shows, the draft angle $\alpha$ is greater than 1.5 degrees and of the order of 2 degrees. Such an angle makes it possible to facilitate the stripping of the winding guide from the mould.

For its part, the small angle $\beta$ is less than or equal to 0.5 degrees, and preferably of the order of 0 to 0.2 degrees. This small angle is such that the winding space 19 has a width that is substantially constant over its entire height, which ensures a winding of the electric wire according to the desired form.

In practice, as FIG. 2 shows, the ribs 142 are all identical and parallel to one another. They extend lengthwise from the edge 143 of the head 13 which is attached to the tooth 12 (or level with this edge), towards the opposite edge 144 of the head.

They extend over a small width, less than the distance which separates them from one another. This width is approximately 3 mm when the total width of the head is of the order of 40 to 60 mm.

They have a substantially zero thickness at the edge 143 of the head 13 (that situated on the side of the tooth 12). This thickness increases linearly towards the free edge 144 of the head 13.

The edges of the ribs are not straight but also have pronounced draft angles.

The ribs 142 are situated at a distance from one another. This distance is at most equal to three times the diameter of the wound electric wire, which prevents the latter from being able to be bent between the ribs. It is preferably between two and three times this diameter.

The ratio of the surface occupied by the ribs 142 to the total surface of the inner face 14 of the tooth 13 is preferably greater than 50%.

It will however be noted that the space between the ribs (and therefore this ratio) depends substantially on the diameter of the wire with which the winding is done.

On the other side of the winding space 19 with respect to the head 13, two stops 18 are provided which, as FIG. 4 shows, here have the forms of studs. These stops could of course have different forms (FIG. 1 represents for example a variant embodiment of the guide in which the stops have the forms of walls rather than studs).

In the preferred embodiment which is illustrated in FIGS. 3 and 4, the studs here have frustoconical forms, of small vertex angle. As FIG. 3 shows, each stud thus has a side 181 oriented towards the head 13 which is inclined by an angle $\delta$ with respect to the longitudinal axis A1 that is at least equal to the draft angle $\alpha$.

A rib 182 rises protruding on this side 181 of the stud. It here has a form identical to that of the ribs 142 of the head 13. This rib 182 therefore has a flat vertex which is inclined with respect to the longitudinal axis A1 by a small angle $\varepsilon$, preferentially comprised between 0 and 0.5° (bounds included).

In this way, as FIG. 3 well illustrates, the winding space 19 has a width L1 which increases very little from the tooth 12 towards the front.

The assembly of the rotor 1 then consists in positioning two winding guides 10 at the ends of the sheets of the frame 1A, such that their teeth 12 extend in the extension of the poles 3, then in winding the electric wire in such a way that it forms a coil 20 around each pair of axially opposite teeth 12 and the pole situated between these teeth 12.

During this winding, the turns of the electric wire are positioned automatically side-by-side, on several layers. Because of the small values of the angles $\beta$ and $\varepsilon$, the width L1 available to each layer of turns varies little, which makes it possible to ensure a reliable automatic winding of the electric wire.

In operation, the rotor revolves at a high speed, so that the coils 20 are subjected to centrifugal forces F1 of high intensity (see FIG. 4). The winding that is well produced allows every other layer of electric wire to be pressed onto the head 13 of the winding guide 10, which then ensures a solid hold of the coils 20 of electric wire.

The present invention is in no way limited to the embodiment described and represented, but the person skilled in the art will be able to add any variant according to the invention to it.

As an example, it would be possible to provide for the ribs not to be parallel to one another, or for them to be different from one another, or for them to have variable widths.

The invention claimed is:

1. A winding guide for an electric machine rotor, comprising:

a base that is substantially circular about a longitudinal axis;

teeth which extend radially from the base; and heads which extend at free ends of the teeth and which project from the teeth in cantilevered fashion, wherein at least one of said heads has an inner face which is turned towards the base and which comprises:

a flat main portion that is inclined by a first angle strictly greater than 0 degrees with respect to the longitudinal axis, and ribs which protrude from the main portion, and vertices of the ribs are flat and inclined with respect to the longitudinal axis by a second angle comprised between zero degrees which is included and the first angle which is excluded.

2. The winding guide according to claim 1, wherein the first angle is greater than 1 degree.

3. The winding guide according to claim 1, wherein the first angle is between 1.5 and 2.5 degrees.

4. The winding guide according to claim 1, wherein the second angle is less than 0.5 degrees.

5. The winding guide according to claim 1, wherein the second angle is between 0 and 0.2 degrees.

6. The winding guide according to claim 1, wherein, with the head extending on one side of the tooth and having a first edge attached to the tooth and an opposite free second edge, said ribs extend lengthwise, for at least a part of the ribs, from the first edge towards the second edge.

7. The winding guide according to claim 6, wherein said ribs have a substantially zero thickness at the first edge.

8. The winding guide according to claim 1, wherein said ribs extend parallel to one another.

9. The winding guide according to claim 8, wherein said ribs are at a distance from one another by a separation less than three times a diameter of an electric wire to be wound around the tooth.

10. The winding guide according to claim 1, wherein stops are provided which rise from the base, substantially parallel to the heads to delimit therewith spaces for winding an electric wire, and in which at least one of said stops has an outer face comprising a side which is inclined by a third angle strictly greater than 0 degrees with respect to the longitudinal axis, and at least one rib which protrudes from the side and the vertex of which is flat and inclined with respect to the longitudinal axis by a fourth angle comprised between zero degrees which is included and the third angle which is excluded.

11. A rotor for an electric machine comprising:

a frame which comprises, distributed about a longitudinal axis, elements with magnetic poles that are separated pairwise by grooves, wherein the frame comprises, at least one of its ends, the winding guide according to claim 1, of which the teeth extend in an extension of the elements with magnetic poles, and a coil of conductive electric wire wound around each element with magnetic poles and the corresponding tooth.

12. An electric motor comprising:

a stator; and the rotor according to claim 11.

13. A motor vehicle comprising:

wheels; and a powertrain configured to drive at least some of said wheels in rotation, wherein the powertrain comprises the electric machine according to claim 12.

\* \* \* \* \*